United States Patent Office 3,532,553
Patented Oct. 6, 1970

3,532,553
CELL WITH PEROXYDIPHOSPHATE DEPOLARIZER
Paul R. Mucenieks, Bernard Cohen, and Leonard R. Darbee, Trenton, N.J., assignors to FMC Corporation, New York, N.Y., a corporation of Delaware
No Drawing. Filed Nov. 25, 1968, Ser. No. 778,837
Int. Cl. H01m 15/00, 17/00
U.S. Cl. 136—100                                    3 Claims

ABSTRACT OF THE DISCLOSURE

This specification discloses primary electric cells which employ an acidified peroxydiphosphate as a depolarizer, a zinc or magnesium negative electrode and a positive electrode.

CROSS REFERENCE TO RELATED APPLICATIONS

This application is related to application Ser. No. 778,619 "Cell With Peroxydisulfate Depolarizer," and application Ser. No. 778,838 "Cell With Peroxymonosulfate Depolarizer" both filed on even date herewith in behalf of Bernard Cohen and Paul R. Mucenieks.

BACKGROUND OF THE INVENTION

Field of the invention

Primary electric cells using a peroxydiphosphate as a depolarizer.

Description of the prior art

The use of primary electric cells, or primary bateries, has increased spectacularly with the increasing use of transistor radios, portable television sets and the like. The most prominent types of primary batteries in service today are the zinc-carbon, alkaline-manganese, and mercury batteries. The zinc-carbon primary electric cells using manganese dioxide as the material to be reduced, i.e., the depolarizer, account for over 80% of the primary batteries. The unrivaled virtue of the zinc-carbon battery is its low cost. The zinc-carbon primary cell has disadvantages in that it produces variable voltage as a function of current drain and has a rather poor shelf life when stored at elevated temperatures. The low cost of the zinc-carbon primary cells is primarily due to the fact that manganese dioxide of suitable quality is currently mined from the earth at a relatively low cost. The substitution of electrolytic manganese dioxide for the natural material, although it improves the cell, will greatly increase the cost of the cell. The alkaline-manganese and mercury batteries are more expensive than the zinc-carbon battery.

Other primary electric cells include silver-zinc, silver-cadmium, thermal and activated ammonium, nickel iron, Lelande batteries, air cells, water activated cells and a considerable number of miscellaneous special cells that are manufactured occasionally for special applications. The water-activated primary batteries capable of powering small radio transmitters and the like use silver chloride or cuprous chloride as depolarizer. These batteries can become activated when sea water, for example, enters the space between the electrodes, for example, when a battery is dropped into the ocean from an aircraft. Magnesium-silver chloride sea water activated batteries are occasionally used for powering torpedos, powering the lights and radio transmitters of life jackets and life rafts carried by ships and aircraft. Silver chloride and cuprous chloride are rather expensive materials. Silver chloride batteries are the most useful of these batteries; however, they are the most expensive.

Water-activated primary cells using relatively inexpensive peroxydisulfates have been developed. However, these cells require the use of relatively expensive diaphragms to make them useful. It is therefore desirable to find materials useful in making water-activated primary electric cells that are made from inexpensive raw materials and do not require the use of a diaphragm to control the deterioration of the anode in the electric cell.

SUMMARY OF THE INVENTION

We have now discovered that primary electric cells can be made which employ an acidified peroxydiphosphate as a depolarizer, a zinc, zinc-base alloy, magnesium, or magnesium-base alloy, negative electrode and a positive electrode. The cell may be operated by placing the electrodes directly into a solution of the depolarizer, by adding water to a protonated peroxydiphosphate anion, or water and acid to an unprotonated peroxydiphosphate anion in a solid form, or by impregnating a carrier, such as paper or similar non-metallic material, with the depolarizer and wetting the carrier either before or after insertion between the proper electrodes. Water is not unique in its ability to activate these batteries. Any conducting liquid constitutes a suitable medium for the depolarizer. By conducting liquid, we mean liquids that conduct, such as electrolytes, and liquids which form a conducting solution when placed in a cell containing a depolarizer.

The primary electric cells of this invention when operated with a magnesium electrode show no current lag when going from the open to the closed circuit. This is quite surprising as heretofore a significant amount of time elapsed between the time a "magnesium battery" was turned on and current began to flow. The cells may be operated without a cell diaphragm. The depolarizer may be employed as a solid to which water, or a suitable conducting liquid, or both are added, or it may be impregnated into a suitable non-metallic carrier. The depolarizer and battery can be constructed to have any desired shape. The primary electric cell is portable, very stable when dry, and shows no deterioration on storage. The depolarizers and the products of the exhausted cells are not toxic.

DESCRIPTION OF THE INVENTION AND THE PREFERRED EMBODIMENTS

Acidified peroxydiphosphates are suitable oxidizers for use in primary electric cells employing zinc or magnesium as negative electrode materials. The cells employing magnesium electrodes were found to have open circuit voltages of 1.93 volts and closed circuit voltages of about 1.66 volts. No delay in the current flow was experienced in going from an open to a closed circuit. The cell employing the zinc metal had an open circuit voltage of 1.33 and a closed circuit voltage of 0.88 volt.

So far as is known by the inventors, all ionizable peroxydiphosphates can be used as depolarizers. Typical useful peroxydiphosphates are the peroxydiphosphates of potassium, sodium, ammonium and lithium. The peroxydiphosphate may be used in solution or loaded in the cell as a solid to which a conducting liquid is added. If the anion of the peroxydiphosphate is unprotonated, i.e., $P_2O_8^{-4}$, an acid species must also be added to the depolarizer. Suitable acidic species, include but are not limited to, acetic acid, $NaHSO_4$, $H_2SO_4$, HCl, $H_3PO_4$, $KH_2PO_4$ and other species containing an ionizable hydrogen ion. A suitable protonated form of the peroxydiphosphate is represented by the formula $X_2H_2P_2O_8$ where $X=NH_4^+$, $Na^+$, $K^+$, or $Li^+$. The cell may be operated at any pH below 6. The preferred pH range for operating the cell is 3–4 as some balance is needed between the acid attack of the anode and the phosphatizing protection offered by the peroxydiphosphate. When the anion of the peroxydiphosphate is unprotonated, that is when the $P_2O_8^{-4}$ is used, an acidic species containing an ionizable hydrogen ion should be added in sufficient quantity as to form one or all of the ions $HP_2O_8^{-3}$, $H_2P_2O_8^{-2}$ or $H_3P_2O_8^{-1}$. Sufficient acid to form $H_4P_2O_8$ should be avoided.

The negative electrode can be zinc, a zinc-base alloy, magnesium, or a magnesium-base alloy. The positive electrode may be platinum, carbon or other materials which do not react or react only to a limited extent with the components of the depolarizer.

Many additives, well known in the art of battery making, for improving the operation of primary electric cells, are useful with the depolarizers of this invention. Conductivity aids, such as acetylene black, carbon black and graphite, binders, oxidation controllers or inhibitors, buffers, catalysts or activation agents, viscosity modifiers, surfactants, rare earths, mercuric chloride and potassium dichromate are all known in the art to be useful in depolarizers.

The primary electric cells of this invention may be operated by placing the electrodes directly into a solution of the depolarizer, by adding water or an appropriate conducting liquid to a protonated peroxydiphosphate anion, or water and acid to an unprotonated peroxydiphosphate anion in a solid form, or by impregnating a carrier such as paper or a similar nonmetallic material with a depolarizer and wetting the carrier with a conducting solution either before or after insertion between the proper electrodes. The cells may be contained in any suitable inert material such as glass, plastic and the like or the electrode material, such as a zinc can, may contain the cell.

The following examples, illustrating the novel primary electric cells disclosed herein, are given without any intention that the invention be limited thereto. All parts and percentages, unless otherwise noted, are by weight.

*Example 1.*—Two-tenths of a gram of solid $K_2H_2P_2O_8$ was placed in a cell between a magnesium electrode and a carbon electrode. Each electrode had an area of 20 cm.$^2$. One milliliter of water was added to the cell. The current drawn was constant at 30 ma. (milliamps). The cell had an open circuit voltage of 1.93 and a closed circuit voltage of 1.66 volts. The cell yielded 1.08 watt minutes and had an efficiency of 34%.

*Example 2.*—One gram of a solution which was 20% by weight $Na_2H_2P_2O_8$ was placed in the cell described in Example 1. The cell was operated at a constant current of 30 ma. The cell had an open circuit voltage of 1.97 and a closed circuit voltage of 1.70 volts. The cell yielded 1.27 watt minutes and had an efficiency of 42%.

*Example 3.*—A cell as described in Example 1 employing a zinc electrode and a carbon electrode was charged with .34 g. $K_4P_2O_8$. To this 0.28 g. of perchloric acid (73% aqueous) was added. The cell was operated at a constant current of 30 ma. The cell had an open circuit voltage of 1.33 and a closed circuit voltage of 0.90 volt. The cell yielded 0.62 watt minute and had a cell efficiency of 18%.

Obviously, these examples could be multiplied indefinitely, in view of the possible permutations and combinations with modifying additives known in the art, without departing from the scope of the invention.

What is claimed is:

1. In a primary electric cell having a zinc, zinc-base alloy, magnesium or magnesium-base alloy negative electrode, and a positive electrode in contact with a depolarizer, the improvement which comprises using as depolarizer an ionizable acidified peroxydiphosphate.

2. The primary electric cell of claim 1 in which the peroxydiphosphate is selected from a group consisting of peroxydiphosphates of ammonium, potassium, lithium and sodium.

3. The primary electric cell of claim 1 in which the ionizable peroxydisulfate depolarizer has an unprotonated anion and a sufficient amount of an acidic species is added to the depolarizer to form the ions $HP_2O_8^{-3}$, $H_2P_2O_8^{-2}$ or $H_3P_2O_8^{-1}$.

References Cited

UNITED STATES PATENTS

| 2,534,403 | 12/1950 | Blake et al. | 136—137 XR |
| 2,800,520 | 7/1957 | McGraw | 136—137 XR |
| 2,952,572 | 9/1960 | Johnson | 136—154 |

WINSTON A. DOUGLAS, Primary Examiner

D. L. WALTON, Assistant Examiner

U.S. Cl. X.R.

136—107, 137